R. B. LEVIS
Aug. 22, 1933.
ROOFING PRODUCT
Re. 18,919
Original Filed Jan. 3, 1928 2 Sheets-Sheet 1
Fig. 1.
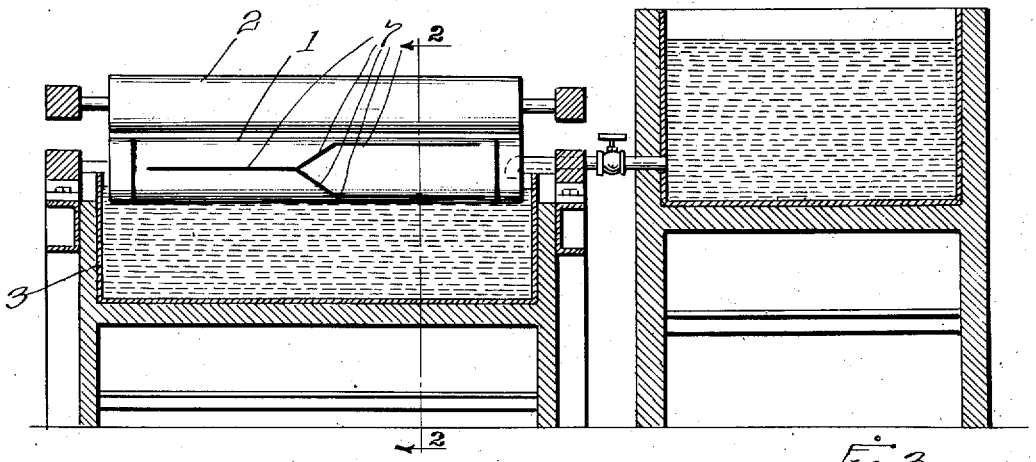
Fig. 2.
Fig. 3.
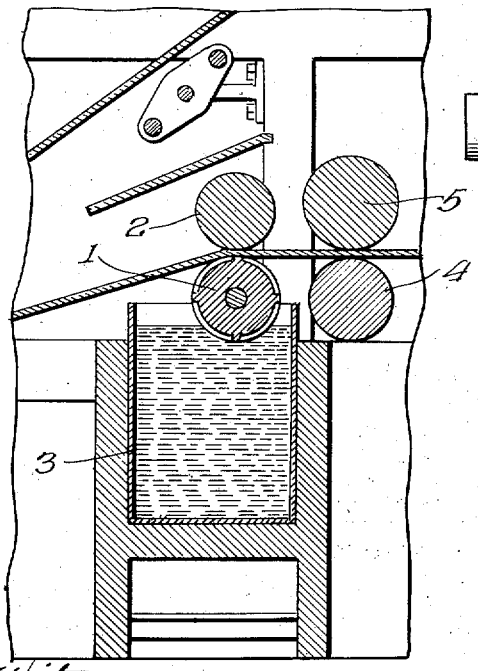
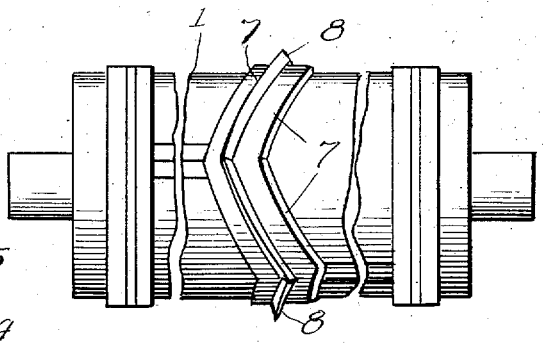
Fig. 4
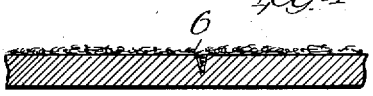
Fig. 5
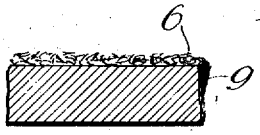
Witness
Harry R. White
Inventor:
Robert B. Levis.
By Rudolph Mu[illegible]
Atty.

R. B. LEVIS
Aug. 22, 1933.
ROOFING PRODUCT
Original Filed Jan. 3, 1928
Re. 18,919
2 Sheets-Sheet 2
Fig. 6
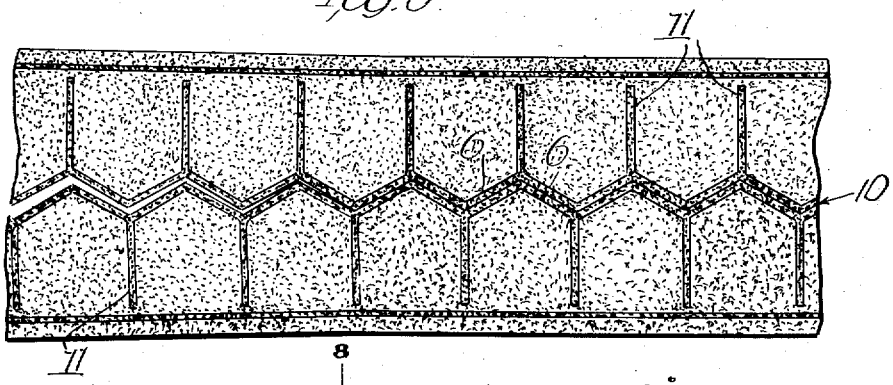
Fig. 7.
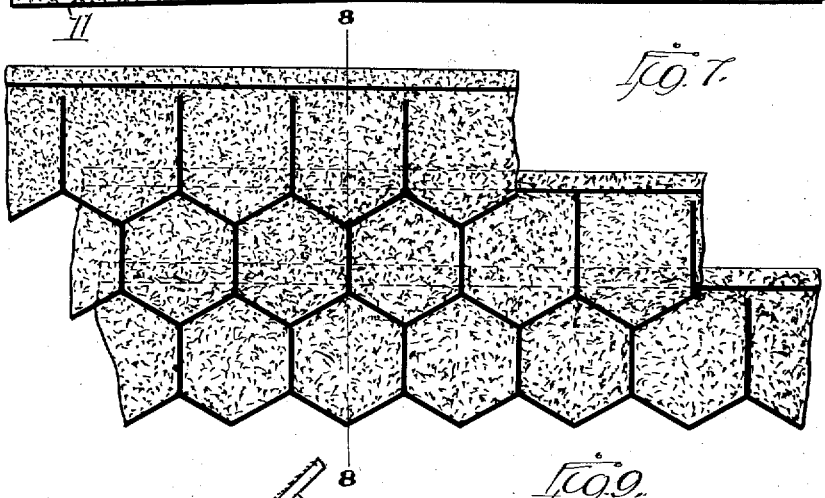
Fig. 9.
Fig. 8
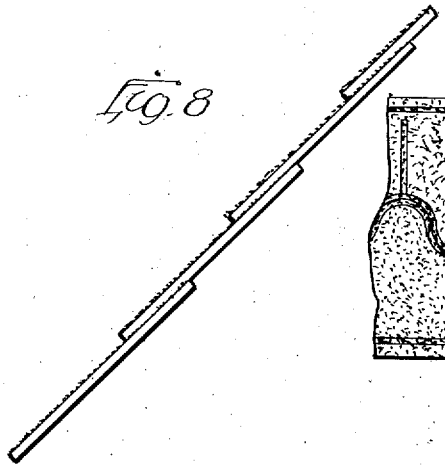
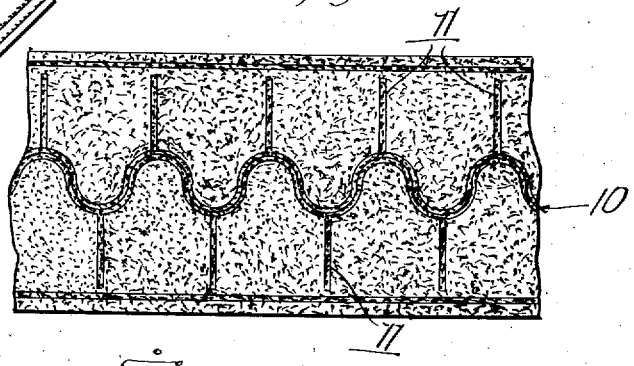
Fig. 10.
Witness:
Harry R. L. White
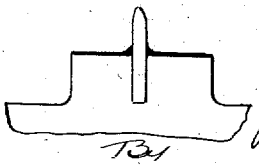
Inventor:
Robert B. Levis.
Rudolph Wm. Fobes
Atty.

Reissued Aug. 22, 1933

Re. 18,919

UNITED STATES PATENT OFFICE 18,919

ROOFING PRODUCT

Robert B. Levis, Chicago, Ill., assignor to Bird & Son, Inc., East Walpole, Mass., a Corporation of Massachusetts Original No. 1,778,903, dated October 21, 1930, Serial No. 244,331, January 3, 1928. Application for reissue September 10, 1932. Serial No. 632,623

4 Claims. (Cl. 108—7)

This invention relates to the art of prepared roofing and more particularly to that class of roofing which is of the shingle type and bears a pattern having for its purpose to cause such roofing to have an appearance similar to tile roofing.

The present invention has for its object to provide roofing per se possessing certain novel characteristics hereinafter described.

In the art to which the invention particularly relates prepared roofing consisting, generally, of a strip of suitable paper known as "wool-felt" paper, which is impregnated and coated with an asphaltic compound and is covered on one face with granulated stone of uniform color, known as "grit", is given the appearance of a shingle or tile roof by applying to the grit coated surface a pattern imitative of the appearance of shingle or tile roofs, the pattern being usually composed of heavy stripes of black to contrast sharply with the light colored grit. A later development consists in cutting a patterned strip of this roofing a medial variated line to produce two strips which are laid in relatively overlapped position with the variated edges in staggered relation to better produce the impression or better imitate a tile roof.

Heretofore attempts have been made to cut such patterned strips by machines along a variated pattern line in order that the variated edges of the resulting pair of strips may be bordered by an appreciable black edging but these attempts have failed by reason of the difficulty involved in passing this coarse and fairly inflexible material through a cutting machine with accuracy, the usual result of such attempts having been that the line of severance at one end of the roofing strip was wholly out of register with the variated pattern stripe at at least one end portion of the strip. To produce marketable strips having variated edges bordered by such a black line from a patterned strip having a medial variated pattern stripe, the line of severance must be midway between the side edges of said stripe.

The present practice is to impregnate and coat the paper strip with asphaltic compound and while the coating is still very plastic to apply the grit and then allow the material to cool and set, then apply the pattern stripes and thereupon pass the strip through the cutting machine, these operations being in many instances successive and continuous and being followed by rolling up and cutting the strip into given lengths, the cutting machine serving only to deeply score but not to completely sever the strip in order that the same may be rolled up.

Manufactures of this type of roofing use various methods of rendering the paper weatherproof. In many instances the paper is first passed through a vat of an oily substance which easily penetrates, is then covered with an asphaltic compound on one or both faces and thereafter goes through the remaining steps above described. In such treatment the asphaltic coating is mainly relied upon to impart the requisite weatherproof characteristics. In severing this type of strip the exposed variated edges not only lack the deep black color of the asphaltic coating but subject the less weatherproof body more directly to the action of the elements with the result that the life of the roofing is shortened.

In other instances, the manufacturer impregnates the roofing paper by boiling the same in an asphaltic compound, which, if it completely penetrates the paper, renders the same deep black throughout and more thoroughly weather-proof but such complete penetration is not always effected so that upon exposing a severed edge of such roofing the unimpregnated portion will absorb moisture and rapidly deteriorate.

Reference may be had to the Becker Patents Nos. 1,024,549—1,024,550—1,157,664—1,557,665—1,222,594—1,256,508 for descriptions of machines, methods and materials particularly adapted for use in connection with the present invention.

In the accompanying drawings illustrating the present invention:

Fig. 1 is a diagrammatic section of a machine for applying pattern stripes to prepared roofing strips, the printing roller of said machine being constructed to produce roofing strips of the present invention.

Fig. 2 is a sectional view on the line 2—2 of Fig. 1.

Fig. 3 is a detail view of the printing and scoring roll of the machine.

Fig. 4 is a fragmentary sectional view of a patterned and scored strip of roofing.

Fig. 5 is a similar view on a larger scale of a severed section of the strip of Fig. 4.

Fig. 6 is a face view of a patterned and scored roofing strip partly severed.

Fig. 7 is a fragmentary view showing several severed strips laid in overlapped relation as on a roof.

Fig. 8 is a sectional view on the line 8—8 of Fig. 7.

Fig. 9 is a view similar to Fig. 6 showing a different pattern.

Fig. 10 is a fragmentary detail section of a printing roller constructed to produce roofing strips of the present invention.

Roofing strips are, in practically all instances, thirty-two inches wide and sixty feet long, each roll of a strip of these dimensions constituting one and one-half squares (150 sq. ft.) allowing for a two inch overlap on the roof.

In the machine of Figs. 1 and 2, the printing or pattern stripe applying roll 1 is partly immersed in the liquid, such as an asphaltic compound contained in the vat 2, said roller thus carrying said liquid up to and applying the same to the grit-coated underface of a roofing strip passing between said roller 1 and a roller 2 disposed above the same and which bears firmly upon said strip. Disposed in advance of the rollers 1 and 2 are rollers 4 and 5 which serve to guide the roofing. The rollers 1 and 2 are preferably driven and geared to rotate in unison in respectively opposite directions by suitable gearing.

The roller 1 has a pattern face adapted to apply or print upon the grip face of the roofing strip a pattern in relatively broad stripes, said pattern, in the instance illustrated, being the conventional one shown in Fig. 6 which includes the zig-zag or variated medial stripe 6. The said pattern face consists of ribs 7 which are suitably equipped midway between their side edges with cutting or scoring blades 8, said blades, in the instance illustrated, being confined to that portion of the roller 1 which imprints upon or applies to the roofing the medial variated strip 6. The blade or blades 8 is of a height somewhat less than the thickness of said strip so as to deeply score without severing the latter so that it may be rolled up and subsequently severed without the use of tools by merely pulling upon opposite side edge portions of the strip.

The blades 8 serve further to collect upon their faces a coating and in the corners formed by the same and the ribs 6, fillets of the liquid. This liquid penetrates into the cut or scoring of the strip and coats in whole or in part the opposed walls of the cut or scoring respectively which forms the exposed edges of the strip after severance. Thus the resulting product differs from the strip or shingles heretofore cut from a strip in that the exposed edges of the product are coated with the weather-proof material 9 used for producing the pattern stripe and also in that the said edges are bordered by pattern stripes of uniform width.

In the patterns shown in Figs. 6 and 8, straight stripes extend in staggered relation from the apexes of the medial variated stripe toward the side edges of the strip and while, in the instance illustrated, the blades 8 are not mounted in the ribs for producing said straight stripes, they may obviously be provided to extend to the side edges of the strip if it be desired to score the same so that it may be readily severed to provide shingles.

For clarity of illustration, the pattern stripes of Figs. 6 and 8 are not shown in the solid black of Fig. 7 in order that the severance line 10 may clearly show, the roofing strip of Fig. 6 being shown as partly severed at the left hand end portion.

In some instances the variated stripe 6 is omitted and the staggered stripes 11 only are applied. It will be obvious that in cutting or scoring a strip to which only the pattern stripes 11 are applied, along the variated line 10, the alternate angles of the latter must register with the said stripes 11. It will be obvious without specific illustration that in such cases the roller 1 will be equipped with the knife blade or blades 8 but the rib 7 will be omitted.

It will be readily appreciated that the illustration and description of the machine used in producing the roofing strips of this invention is resorted to as constituting the best manner in which to present a clear description of the product of this invention without limitation of the latter to any particular machine or method of producing the same.

I claim as my invention:

1. As an article of manufacture, a strip of prepared roofing bearing an overlaid pattern composed of stripes of a coagulated liquid weather proof material and scored along at least some of the pattern lines in register with the latter for permitting easy severance of said strip to provide therefrom roofing elements, the overlaid material substantially filling the scorings and providing coatings for the edges of the elements resulting from severance of the strips along the scorings.

2. As an article of manufacture, a strip of prepared roofing bearing an overlaid pattern composed of stripes of a coagulated liquid weather proof material and scored along at least some of the pattern lines and midway of the side edges of the latter for permitting severance of the strip into roofing elements, the overlaid material substantially filling the scorings and providing coatings for the edges of the elements resulting from severance of the strip along the scorings, said edges bordered by overlaid stripes of uniform width.

3. As an article of manufacture, a strip of prepared roofing bearing an overlaid pattern composed of stripes of a coagulated liquid waterproof material and cut longitudinally along at least some of the pattern lines in register with the latter to provide therefrom elongated roofing elements, the overlaid material substantially filling and providing coatings for the edges of the elements exposed by the cut.

4. As an article of manufacture, a strip of prepared roofing bearing on the surface thereof, a pattern composed of stripes of a waterproof material of contrasting color and cut longitudinally along at least some of the pattern lines in register with the latter to provide therefrom roofing elements, the said waterproof material protecting and substantially covering the edges of the elements exposed by the cut.

ROBERT B. LEVIS.